US006321009B1

United States Patent
Klein Koerkamp

(10) Patent No.: US 6,321,009 B1
(45) Date of Patent: Nov. 20, 2001

(54) CASCADE THERMO-OPTICAL DEVICE

(75) Inventor: Hermanus Marcellinus Maria Klein Koerkamp, Enschede (NL)

(73) Assignee: JDS Uniphase Inc., Nepean (CA)

( * ) Notice: Subject to any disclaimer, the term of this patent is extended or adjusted under 35 U.S.C. 154(b) by 0 days.

(21) Appl. No.: 08/952,986

(22) PCT Filed: May 30, 1996

(86) PCT No.: PCT/EP96/02343

§ 371 Date: Dec. 2, 1997

§ 102(e) Date: Dec. 2, 1997

(87) PCT Pub. No.: WO96/38756

PCT Pub. Date: Dec. 5, 1996

(30) Foreign Application Priority Data

Jun. 2, 1995 (EP) ................................... 95201460

(51) Int. Cl.[7] ...................................................... G02B 6/42
(52) U.S. Cl. ............................................................ 385/45
(58) Field of Search ......................................... 385/45, 14

(56) References Cited

U.S. PATENT DOCUMENTS

| 4,737,002 | 4/1988 | Boucouvalas | 350/96.13 |
| 4,753,505 | 6/1988 | Mikami et al. | 350/96.13 |
| 5,832,155 | * 11/1998 | Rasch et al. | 385/48 |

FOREIGN PATENT DOCUMENTS

| 378 185 | 7/1990 | (EP) | C08F/20/36 |
| 445 864 | 9/1991 | (EP) | C08G/18/00 |
| 359 648 | 3/1990 | (EP) | C08G/18/38 |
| 350112 | 1/1990 | (EP) | C08G/18/67 |
| 350113 | 1/1990 | (EP) | C08G/63/68 |
| 642 052 | 3/1995 | (EP) | G02F/1/29 |
| 358 476 | 3/1990 | (EP) | G03F/7/00 |
| 225980 | 12/1924 | (GB) | |

OTHER PUBLICATIONS

Diemeer, et al., "Polymeric Optical Waveguide Switch Using the Thermooptic Effect", vol. 7, *Journal of Lightwave Technology*, pp. 449–453 (Mar. 1989).

Singer, "Nonlinear Optical Properties of Organic Materials IV", vol. 1560, *SPIE—The International Society for Optical Engineering*, pp. 426–433 (Jul. 1991).

Diemeer, et al., "Fused Coupler Switch Using a Thermo–Optic Cladding", vol. 24, No. 8, *Electronics Letters*, pp. 457–458 (Apr. 1988).

Granestrand, et al. "Integrated Optics 4×4 Switch Matrix with Digital Optical Switches", vol. 26, No. 1, *Electronics Letters*, pp. 4–5, (Jan. 1990).

O'Donnell, "Polarisation Independent 1×16 and 1×32 Lithium Niobate Optical Switch Matrices", vol. 27, No. 25, *Electronics Letters*, pp. 2349–2350 (Dec. 1991).

* cited by examiner

*Primary Examiner*—Hung N. Ngo
(74) *Attorney, Agent, or Firm*—Lacasse & Associates; Randy W. Lacasse; Kevin E. Greene

(57) ABSTRACT

The invention pertains to a thermo-optical device comprising a waveguiding structure (1) which comprises at least one input light path (2) and at least two output light paths (3,3') forming a first y-splitter (4), at least one output light path (3,3') being provided with primary heating elements (5,5'), characterised in that the output light paths (3,3') are provided with an additional branch (6) forming a second y-splitter (7), wherein at least one of the branches (6,6') is provided with a secondary heating element (8,8'). The additional branches (6) may be positioned in the opposite direction, such that in each of the second y-splitters (7) one branch (6') coincides with one of the output light paths (3,3') of the first y-splitter (4).

23 Claims, 3 Drawing Sheets

CASCADE THERMO-OPTICAL DEVICE

The invention pertains to a thermo-optical device comprising an optical waveguiding structure which comprises at least one input light path and at least two output light paths forming a first y-splitter, at least one output light path being provided with a primary heating element.

BACKGROUND OF THE INVENTION

Thermo-optical devices are known, e.g., from the description given by Diemeer et al. in *Journal of Lightwave Technology*, Vol. 7, No. 3 (1989), 449–453. Their working is generally based on the phenomenon of the optical waveguide material employed exhibiting a temperature dependent refractive index (polarisation independent thermo-optical effect). Such devices have been realised, int. al., in inorganic materials such as ion-exchanged glass and titanium-doped lithium niobate. An advantage of the use of all-polymeric waveguides for thermo-optical devices disclosed by Diemeer et al. consists in that a modest increase in temperature may result in a large index of refraction change. The device described by Diemeer is an all-polymeric planar switch. Switching is achieved by employing total internal reflection from a thermally induced index barrier. The device comprises a substrate (PMMA), a waveguiding structure (polyurethane varnish), and a buffer layer (PMMA), with the heating element being a silver stripe heater deposited by evaporation upon the buffer layer through a mechanical mask.

A thermo-optical switching device has also been disclosed by Möhlmann et al. in *SPIE Vol.* 1560 *Nonlinear Optical Properties of Organic Materials IV* (1991; ), 426–433. Use is made of a polymer in which a waveguide channel can be created through irradiation. The disclosed device is a polarisation/wavelength insensitive polymeric switch comprising an asymmetric Y-junction. The switching properties are based on heat-induced refractive index modulations causing variations in the mode evolution in such asymmetric Y-junctions. The device comprises a glass substrate and a polymeric multilayer comprising an NLO polymer. Another thermo-optical device disclosed is a thermo-optically biassed electro-optic Mach Zehnder interferometer.

In Electronic Letters, Vol. 24, No. 8 (1988), 457–458 an optical switch is disclosed in which optical fibers are coupled using a single-mode fused coupler having a silicone resin cladding material applied over the coupling region. Switching is achieved by a thermally induced refractive index change of the silicone cladding.

In U.S. Pat. No. 4,753,505 a thermo-optical switch is described comprising a layered waveguide in which the material having a temperature dependent refractive index is a polymer or glass.

In U.S. Pat. No. 4,737,002 a thermo-optical coupler is described which may be formed using either optical fibers or integrated optics.

In EP-A-0 642 052 and Granestrand et al., "Integrated Optics 4×4 Switch Matrix With Digital Optical Switches," Electronics Letters, Jan. 4, 1990, Vol. 26, No. 1, pp. 4–5, a cascade or tree structure of 1×2 optical switches is disclosed.

In GB-A-225980 discloses a network comprising two 1×2 optical switches, wherein the input of one of the switches is optically connected to one of the output of the other switch.

While the disclosed polymeric thermo-optical devices sufficiently establish that thermo-optical effects can be employed to achieve, e.g., switching, in the known devices the extinction (defined as: 1010 log= (optical power on)/optical power off) leaves much to be desired and crosstalk is often a problem. These problems can be solved by providing a thermo-optical device with a waveguiding structure of a specific design.

SUMMARY OF THE INVENTION

To this end the invention consists in that in a polymeric thermo-optical device of the type identified in the opening paragraph the output light paths (3,3') are provided with an additional branch (6) forming a second y-splitter (7), with at least one of the branches (6,6') being provided with a secondary heating element (8,8').

BRIEF DESCRIPTION OF THE DRAWINGS

The reference numbers refer to numbers used in the FIGS. 1a, 1b, and 2.

DETAILED DESCRIPTION OF THE INVENTION

The thermo-optical device according to the invention thus comprises an additional y-splitter. In fact, a cascade of splitters has been made. Cascading of splitters appears to lead to an improvement of the extinction ratio and a decrease of crosstalk. When using the thermo-optical devices according to the invention, only one output path of the second y-splitter is a functional output path. When this functional output path is in the "off" state, the other branch is used for directing light into, in order to decrease the optical power in the functional output path, thus improving the extinction and decreasing crosstalk.

Figure 2:
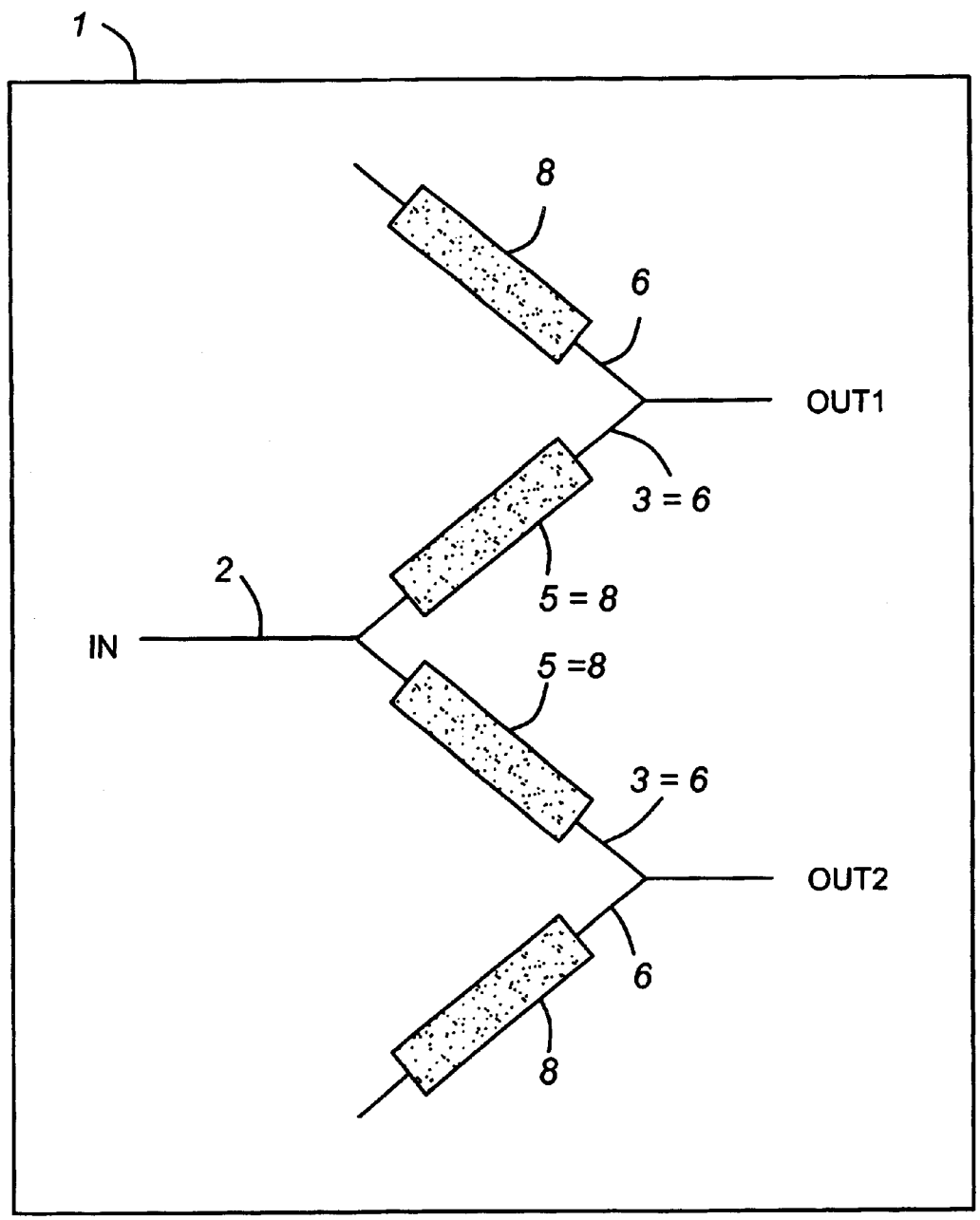
FIG. 2 shows a schematic top view of a waveguiding structure (1) having a compressed design according to the invention.

Thermo-optical devices where the additional branches (6) are positioned in the opposite direction, such that in each of the second y-splitters (7) one branch (6') coincides with one of the output light paths (3,3') of the first y-splitter (4), are especially preferred. This more compressed design provides thermo-optical devices with a higher density (more input and output ports per $cm^2$). Further, due to the reduced length of the device, less insertion loss occurs. Furthermore, the number of heating elements is reduced in this design, also reducing the number of electrical contacts needed. This preferred embodiment of the invention is illustrated in FIG. 2 described below.

A device according to the invention may be formed using either optical fibers or integrated optics. Of these integrated optics the polymer thermo-optical devices are preferred, since even a modest temperature change can give rise to a large change in refractive index.

An integrated thermo-optical device may be built up, e.g., as follows. Underneath the waveguiding structure there is a support, e.g., a glass or silicon substrate. On the substrate the following successive layers can be identified: a lower cladding layer, a core layer (guiding layer), and an upper cladding layer. The cladding material may be glass or a polymeric material. Said cladding layers have an index of refraction lower than that of the core layer. The core layer, which comprises the actual waveguiding design, may be made of inorganic or polymeric material.

The waveguiding structure as provided in the present invention may be incorporated into any kind of thermo-optical device, such as symmetric thermo-optical devices, asymmetric thermo-optical devices, and thermo-optical devices with asymmetric layer build-up as described below.

In an asymmetric device one of the output paths of the first splitter is wider than the other, creating a default switching state. In principle, this splitter only needs one heating element in the first y-splitter. The thermo-optical device according to the invention may comprise any combination of symmetric and asymmetric y-splitters.

In a thermo-optical switch with asymmetric layer build-up the cladding adjacent to the heating elements has a lower refractive index than the other cladding layer. The waveguiding structure with the specific design according to the invention may be used with advantage in these types of thermo-optical devices. Thermo-optical devices with an asymmetric layer build-up have an improved thermo-optical performance. When using a polymeric core layer, the use of polymeric cladding layers is preferred. In these all-polymeric devices it is easy to adjust the physical properties of the various layers one to the other, providing a more stable device. The polymers used for these layers are so-called optical polymers.

The refractive index of the optical polymers used will generally be within the range of from 1.4 to 1.8, preferably of from 1.45 to 1.60. The refractive index contrast between the two cladding layers may vary when a thermo-optical device with asymmetric layer build-up is used.

Optical, polymers are known, and the person of ordinary skill in the art is able to choose polymers having the appropriate refractive indices, or to adapt the refractive indices of polymers by chemical modification, e.g., by introducing monomeric units that affect the refractive index. As all polymers exhibit a thermo-optical effect, basically any polymer having sufficient transparency for the wavelength used can be employed in the core of the waveguide component. Said transparency requirement also holds for the cladding. Particularly suitable optical polymers include polyacrylates, polycarbonates, polyimides, polyureas, polyarylates.

A waveguiding structure according to the invention can be provided with a pattern of light paths (the specific design) in various manners. Methods to achieve this are known in the art. For example, it is possible to introduce such a pattern by removing portions of the slab waveguide, e.g., by means of wet-chemical or dry etching techniques (reactive ion etching, laser ablation), and to optionally fill the gaps formed with a material having a lower index of refraction. Or, e.g., photosensitive material that can be developed after irradiation may be used. In the case of a negative photoresist the photosensitive material is resistent to the developer after irradiation, and the portions of the material that were not subjected to irradiation can be removed. It is preferred to use a positive photoresist, and to define the channels by means of an irradiation mask covering the waveguide portions that will form the channels. The irradiated material then is removed using developer, after which a material of lower refractive index is applied.

It is more strongly preferred, however, to use a core material that allows defining a waveguide pattern without material having to be removed. Materials of this nature exist, e.g., those that will undergo chemical or physical conversion into a material having a different refractive index when subjected to heat, light, or UV radiation. In the cases where this conversion results in an increase in the refractive index, the treated material will be employed as core material for the waveguide channels. This can be carried through by employing a mask in which the openings are identical with the desired waveguide pattern. In the case of the treatment leading to a decrease of the refractive index, the treated material is suitable as a cladding material. In that case a mask as mentioned above is used, i.e., one that covers the desired waveguide channels. A particular, and preferred, embodiment of this type of core material is formed by polymers that can be bleached, i.e., of which the refractive index is lowered by irradiation with visible light or UV, without the physical and mechanical properties being substantially affected. To this end it is preferred to provide the slab waveguide with a mask that covers the desired pattern of waveguide channels, and to lower the refractive index of the surrounding material by means of (usually blue) light or UV radiation. Bleachable polymers have been described in EP 358 476.

It is further preferred to employ NLO polymers in the core, in order to have the possibility of making combined thermo-optical/electro-optic devices.

Optically non-linear materials, also called non-linear optical (NLO) materials, are known. In such materials non-linear polarisation occurs under the influence of an external field of force (such as an electric field). Non-linear electric polarisation may give rise to several optically non-linear phenomena, such as frequency doubling, Pockels effect, and Kerr effect. Alternatively, NLO effects can be generated opto-optically or acousto-optically. In order to render polymeric NLO materials NLO-active (obtain the desired NLO effect macroscopically), the groups present in such a material, usually hyperpolarisable sidegroups, first have to be aligned (poled). Such alignment is commonly effected by exposing the polymeric material to electric (dc) voltage, the so-called poling field, with such heating as will render the polymeric chains sufficiently mobile for orientation. NLO polymers are described in, int. al., EP 350 112, EP 350 113, EP 358 476, EP 445 864, EP 378 185, and EP 359 648.

Making a polymeric optical waveguide according to the invention will generally involve applying a solution of the polymer used as the lower cladding to a substrate, e.g., by means of spincoating, followed by evaporating the solvent. Subsequently, the core layer, and the upper cladding layer, can be applied in the same manner. On top of the upper cladding the heating element will be placed, e.g., by means of sputtering, chemical vapour deposition, or evaporation and standard lithographic techniques. For fixation and finishing a coating layer may be applied on top of the entire structure, so as to allow better handling of the device. Alternatively, instead of a coating layer a glue layer may be used for fixation, after which the total structure can be finished by placing an object glass on it.

When making all-polymeric layered waveguide structures, it is advantageous to apply the individual layers in the form of cross-linkable polymers. These are polymers which comprise cross-linkable monomers or polymers which comprise so-called crosslinkers such as polyisocyanates, polyepoxides, etc. This makes it possible to apply polymers on a substrate and cure the polymer so that a cured polymeric network is formed that does not dissolve when the next layer is provided.

Suitable substrates are, int. al., silicon wafers, ceramic materials or plastics laminates, such as those based on epoxy resin which may be reinforced or not. Suitable substrates are known to the skilled man. Preferred are substrates that, by virtue of a high thermal conductivity, can function as a heat sink. This can considerably speed up the thermo-optical switching process. For, considering that switching to, say, the "on" state can be reached by heating the waveguide, reaching the "off" state will merely require leaving the waveguide to cool. The preferred substrates in this respect are glass, metal, or ceramics, and particularly silicon.

In order to avoid loss of light through the lower cladding layer, it is preferred to use a lower cladding layer which is made up of two sublayers, the lower of which (i.e., the one adjacent to the substrate) is a thin layer (e.g., about 3 µm) having a lower index of refraction than the other sublayer (i.e., the one adjacent to the core layer). Thus, the actual waveguiding structure is "optically isolated" from the substrate. This is particularly important if the substrate is one chosen for its heat-dissipating properties rather than for its refractive index. For instance, silicon is an excellent heat sink, but has a higher index of refraction than the layers making up the waveguide. This may lead to loss of light due to radiation of the light into the silicon substrate. The additional low index layer provides the certainty that all the light will propagate through the waveguide. In order to have an optimal thermal profile, it is preferred to have the lower cladding layer as thin as possible. This is possible through the use of an additional low index layer. By virtue of polymeric materials being preferably chosen over inorganic materials, this can be realised in a simple manner.

The heating element will generally be made up of a thin film electric conductor, usually a thin metal film. Such a thermal energy generating live electric conductor can also be called "resistor wire" for short.

Of course, suitable thermal energy generating conductors are not restricted to the wire form.

The thermal energy generating live electric conductor, the resistor wire, may be a heating element known in itself from the field of thin-film technology, such as Ni/Fe or Ni/Cr. Alternatively, it is possible to employ as electric conductor those materials which are known from the field of electro-optic switches as the ones from which electrodes are made. These include noble metals, such as gold, platinum, silver, palladium, or aluminium, as well as those materials known as transparent electrodes, e.g., indium tin oxide. Aluminium and gold are preferred.

If poled NLO polymers are employed in the present waveguides, using heating elements that can function as an electrode makes it possible to combine thermo-optical and electro-optic functions in a single device.

In the case of the functions of the electrode and the resistor wire being combined, a surge can be realised in actual practice by, say, employing a feed electrode of relatively large diameter (low current density) followed by a segment having a comparatively small diameter. A high current density will then be created in this narrow segment, so that heat is generated. Alternatively, it is possible to employ a material made up of two metals of different intrinsic resistance, and to vary either the thickness of the different metallisations or the composition of the material in such a way as to obtain the desired effect of a low current density, or a low intrinsic resistance upon supply, while a high current density or a comparatively high intrinsic resistance is displayed at the location where the thermo-optical effect is desired. By thus varying current densities it is possible to locally obtain a thermo-optical effect. In the case of NLO polymers being employed, the heating element may be put to initial use during the alignment of the NLO polymers.

Devices according to the invention can be used with advantage in optical communication networks of various kinds. Generally, the thermo-optical components either will be directly combined with optical components such as light sources (laser diodes) or detectors, or they will be coupled to input and output optical fibers, usually glass fibers.

DESCRIPTION OF THE DRAWINGS

The invention is further illustrated with reference to the following FIGS. 1a, 1b, and 2.

Figure 1A:
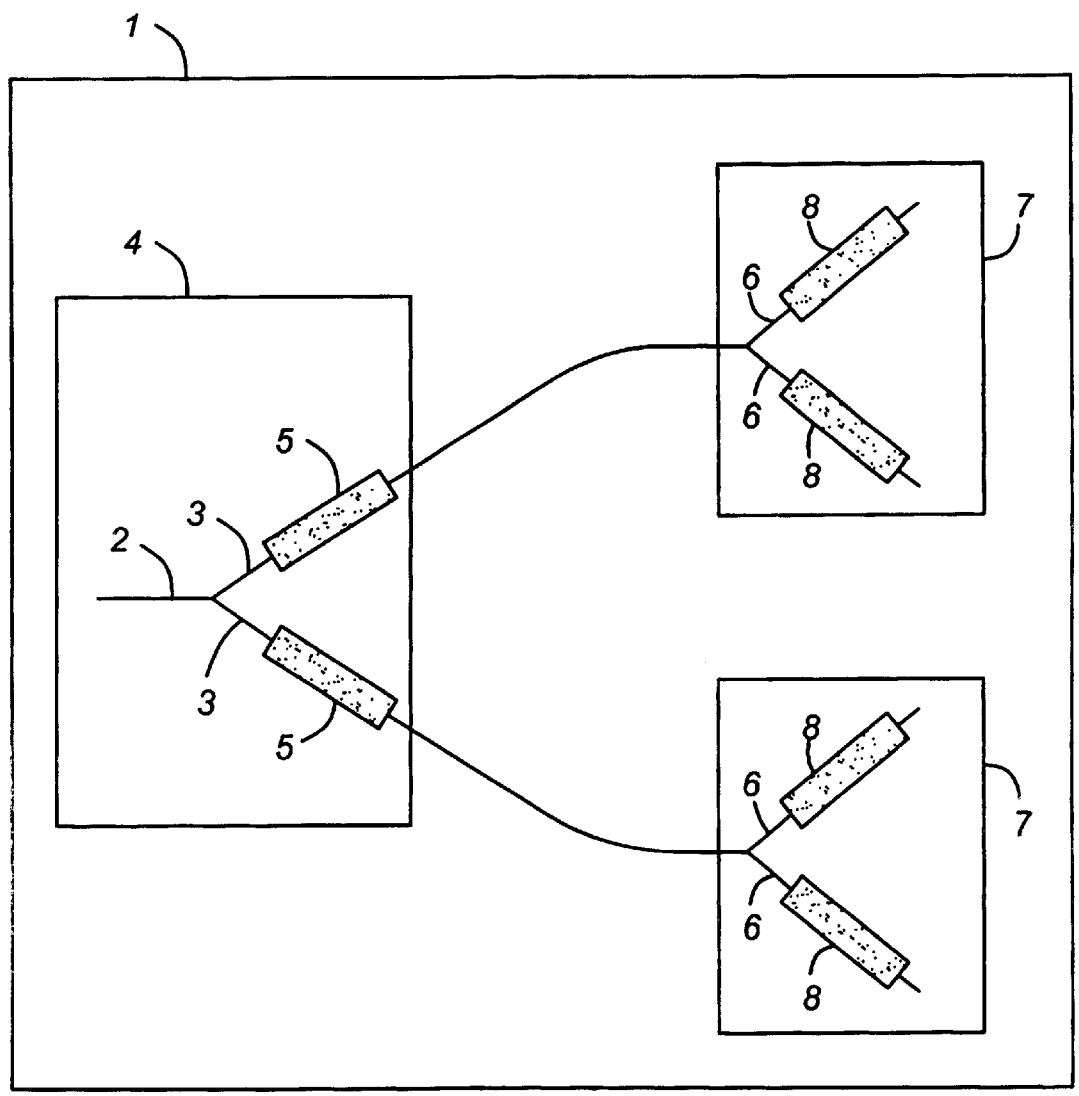
FIG. 1a shows a schematic top view of a waveguiding structure (1) having a specific design according to the invention.

FIG. 1a shows a schematic top view of a waveguiding structure (1) having a specific design according to the invention. FIG. 1b shows a schematic top view of waveguiding structure (1) having another specific design according to the invention. FIG. 2 shows a schematic top view of a waveguiding structure (1) having a compressed design according to the invention.

FIG. 1a shows a schematic top view of a waveguiding structure (1) comprising an input light path (2) and two output light paths (3,3') forming a first y-splitter (4), each output light path (3,3') being provided with primary heating elements (5,5'). The output light paths (3,3') are each provided with an additional branch (6) forming a second y-splitter (7), which branches (6,6') are provided with secondary heating elements (8,8').

Figure 1B:
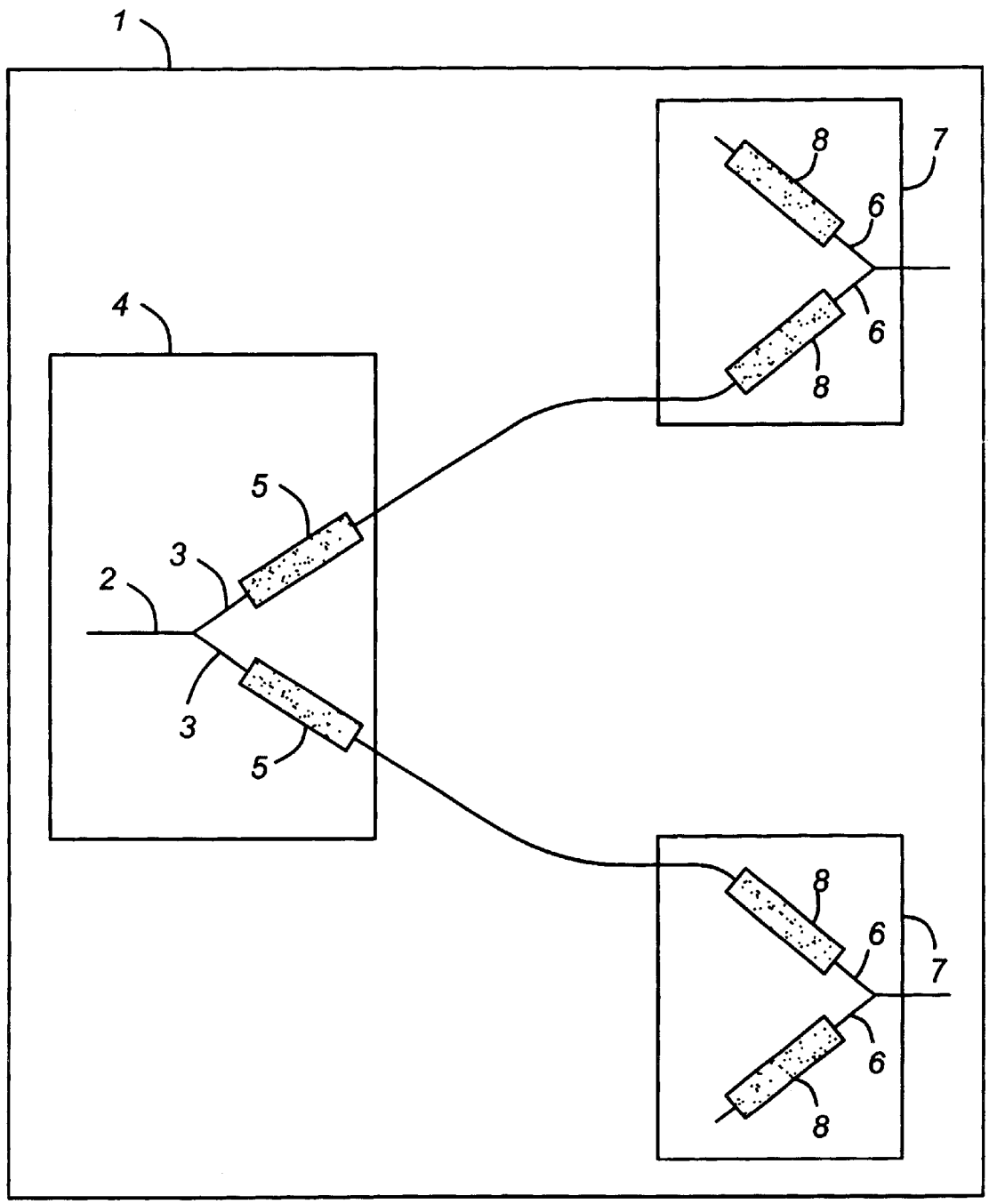
FIG. 1b shows a schematic top view of a waveguiding structure (1) having another specific design according to the invention.

FIG. 1b shows a schematic top view of a waveguiding structure (1) comprising an input light path (2) and two output light paths (3,3') forming a first y-splitter (4), each output light path (3,3') being provided with primary heating elements (5,5'). The output light paths (3,3') are each provided with an additional branch (6) positioned in the opposite direction forming a second y-splitter (7), which branches (6,6') are provided with secondary heating elements (8,8').

FIG. 2 shows a schematic top view of a waveguiding structure (1) where the additional branches (6) are positioned in the opposite direction, such that in each of the second y-splitters (7) one branch (6') coincides with one of the output light paths (3,3') of the first y-splitter (4). If the light is switched from the input (IN) to the upper output (OUT 1), heating elements (8) and (5'=8) are heated. With this more compressed design a device having a higher density can be obtained.

What is claimed is:

1. A thermo-optical device comprising a waveguiding structure (1) which comprises at least one input light path (2) and at least two output light paths (3, 3') forming a first y-splitter (4), at least one output light path (3, 3') being provided with primary heating elements (5, 5') wherein at least one of the output paths (3, 3') is provided with an additional branch (6) forming a second y-splitter (7) and at least one of the branch (6) and the output light path (6') is provided with a secondary heating element (8, 8').

2. The thermo-optical device of claim 1, wherein the additional branches (6) are positioned in the opposite direction, such that in each of the second y-splitters (7) one branch (6') coincides with one of the output light paths (3,3') of the first y-splitter (4).

3. The thermo-optical device of claim 1 further comprising a support underneath the waveguiding structure and wherein the waveguiding structure comprises two cladding layers and a core layer.

4. The thermo-optical device of claim 1 wherein the thermo-optical device is a polymeric device.

5. The thermo-optical device of claim 1 wherein the device is asymmetric.

6. The thermo-optical device of claim 3 wherein the cladding layer adjacent to the heating elements has a lower refractive index than the other cladding layer.

7. The thermo-optical device of claim 2 wherein underneath the waveguiding structure there is a support and the waveguiding structure comprises two cladding layers and a core layer.

8. The thermo-optical device of claim 2 wherein the thermo-optical device is a polymeric device.

9. The thermo-optical device of claim 3 wherein the thermo-optical device is a polymeric device.

10. The thermo-optical device of claim 7 wherein the thermo-optical device is a polymeric device.

11. The thermo-optical device of claim 2 wherein the device is asymmetric.

12. The thermo-optical device of claim 3 wherein the device is asymmetric.

13. The thermo-optical device of claim 4 wherein the device is asymmetric.

14. The thermo-optical device of claim 7 wherein the device is asymmetric.

15. The thermo-optical device of claim 8 wherein the device is asymmetric.

16. The thermo--optical device of claim 9 wherein the device is asymmetric.

17. The thermo-optical device of claim 10 wherein the device is asymmetric.

18. The thermo-optical device of claim 4 wherein the cladding layer adjacent to the heating elements has a lower refractive index than the other cladding layer.

19. The thermo-optical device of claim 5 wherein the cladding layer adjacent to the heating elements has a lower refractive index than the other cladding layer.

20. The thermo-optical device of claim 7 wherein the cladding layer adjacent to the heating elements has a lower refractive index than the other cladding layer.

21. The thermo-optical device of claim 1 wherein not only the guiding layer but also the cladding layers are polymeric.

22. The thermo-optical device of claim 1 wherein the lower cladding is divided into two sublayers: a sublayer having a higher index of refraction adjacent to the guiding layer, and a sublayer having a lower index of refraction adjacent to the substrate.

23. The thermo-optical device of claim 1 wherein only one output path of the second y-splitter is a functional output path.

* * * * *